United States Patent
Patariu et al.

(10) Patent No.: US 7,533,273 B2
(45) Date of Patent: May 12, 2009

(54) METHOD AND SYSTEM FOR CONTROLLING AN ENCRYPTION/DECRYPTION ENGINE USING DESCRIPTORS

(75) Inventors: Kevin Patariu, San Diego, CA (US);
Iue-Shuenn Chen, San Diego, CA (US);
Jay Kwok Wa Li, Milpitas, CA (US);
Cynthia Dang, Cerritos, CA (US);
Mark Taylor Core, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1112 days.

(21) Appl. No.: 10/414,724

(22) Filed: Apr. 15, 2003

(65) Prior Publication Data

US 2004/0208314 A1    Oct. 21, 2004

Related U.S. Application Data

(63) Continuation of application No. 60/455,925, filed on Mar. 19, 2003.

(51) Int. Cl.
*H04L 9/32* (2006.01)
*H04K 1/04* (2006.01)
*H04K 1/00* (2006.01)

(52) U.S. Cl. .................... 713/189; 713/190; 380/29; 380/37

(58) Field of Classification Search ......... 713/189–194; 380/29, 37
See application file for complete search history.

(56) References Cited

U.S. PATENT DOCUMENTS 6,625,671 B1 *  9/2003  Collette et al. ................ 710/52
6,704,871 B1 *  3/2004  Kaplan et al. ............... 713/192

* cited by examiner

*Primary Examiner*—Hosuk Song
(74) *Attorney, Agent, or Firm*—McAndrews, Held & Malloy, Ltd.

(57) ABSTRACT

Controlling an encryption/decryption device using descriptors may include formatting a first block of memory to contain a generic data template used to control the encryption/decryption device. The first memory block may be configured with actual data values corresponding to the generic data template. At least a portion of the configured actual data values may be acquired and used for controlling one or more operations of the encryption/decryption device. A second memory block may be configured in a manner compatible with the first memory block format. The second memory block may also be configured with actual data values corresponding to the generic data template of first block of memory. The second block of memory may be linked to the first memory block. The first and second block of memory may be a random access memory.

36 Claims, 5 Drawing Sheets

METHOD AND SYSTEM FOR CONTROLLING AN ENCRYPTION/DECRYPTION ENGINE USING DESCRIPTORS

CROSS-REFERENCE TO RELATED APPLICATIONS/INCORPORATION BY REFERENCE

This application makes reference to, claims priority to and claims the benefit of U.S. Provisional Patent Application Ser. No. 60/455,925 entitled "System and Method for Data Encryption and Decryption" filed on Mar. 19, 2003.

This application also makes reference to:
U.S. patent application Ser. No. 10/414,844 entitled "Method And System For Data Encryption And Decryption" filed on Apr. 15, 2003;
U.S. patent application Ser. No. 10/414,577 entitled "Method And System For Data Encryption/Decryption Key Generation And Distribution" filed on Apr. 15, 2003;
U.S. patent application Ser. No. 10/417,051 entitled "Method And System For Secure Access And Processing Of An Encryption/Decryption Key" filed on Apr. 16, 2003; and
U.S. patent application Ser. No. 10/414,575 entitled "Method And System For Data Encryption And Decryption" filed on Apr. 16, 2003.

The above stated applications are incorporated herein by reference in their entirety.

FIELD OF THE INVENTION

Certain embodiments of the invention relate to data security. More specifically, certain embodiments of the invention relate to a method and system for controlling an encryption/decryption engine using descriptors.

BACKGROUND OF THE INVENTION

In some conventional encryption applications, it is necessary to send data to a hard disk to be encrypted and retrieve data from the hard disk for decryption. One such application is personal video recording (PVR). In such systems, the encryption/decryption functions are implemented by separate devices between the ATA host adapter and the ATA bus connector. ATA stands for AT Attachment, a standardized interface used by storage devices such as hard disk drives, CD drives and DVD drives. ATA compatible drives may also be referred to as integrated drive electronics (IDE) drives. One drawback with conventional separate device implementations is that unencrypted or "clear" data is available at the interface between the ATA host adapter and the external encryption/decryption chip, and can be intercepted and stored in unencrypted form. Additionally, the encryption used in conventional systems is not particularly "strong" and could be broken relatively easily.

Even though increasing the number of bits utilized during an encryption operation may make an encrypted data more secure, the processing of additional bits generally require additional processing or computing power. Moreover, since the increased number of encrypted bits may require a much wider bus width, additional hardware and transmission bandwidth may also be required. The additional processing power, hardware and transmission bandwidth translates into increased cost.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for controlling an encryption/decryption device or engine using descriptors. A method for controlling an encryption/decryption device using descriptors may include formatting a first block of memory to contain a generic data template used to control the encryption/decryption device. The first memory bock may be configured with actual data values corresponding to the generic data template. At least a portion of the configured actual data values may be acquired and used for controlling one or more operations of the encryption/decryption device. A second memory block may be configured in a manner compatible with the first memory block format. The second memory block may also be configured with actual data values corresponding to the generic data template of the first block of memory.

The second memory block may be linked to the first memory block. The first and second memory blocks may be a random access memory. At least a portion of the actual data values in the linked second memory block may be acquired and used to control one or more operations of the encryption/decryption device. Particular bits of the generic data template may be mapped to one or more operations used to control the encryption/decryption device. Particular values of the mapped bits may be translated into said one or more operations used to control the encryption/decryption device.

A least a portion of the actual data values may represent, for example, a memory read operation in a particular format, a memory write operation in the particular format, an encryption operation in a particular mode, a decryption operation in the particular mode, and a particular key to utilize for said encryption and decryption operation. The particular format for the read and write operations may be a big-endian or a little-endian format. The particular mode for the encryption and decryption operations may be, for example, a DES mode and a 3DES mode.

Another embodiment of the invention provides a machine-readable storage, having stored thereon a computer program having at least one code section for controlling an encryption/decryption device or engine using descriptors, the at least one code section being executable by a machine for causing the machine to perform the steps as described above.

Another aspect of the invention provides a system for controlling an encryption/decryption device or engine using descriptors. The system may include at least one processor that may be adapted to format a first block of memory to contain a generic data template for controlling the encryption/decryption device. The processor may be adapted to configure the first memory block with actual data values corresponding to the generic data template. At least one controller may be adapted to acquire at least a portion of the configured actual data values and control at least one operation of the encryption/decryption device using the actual data values. The processor may be adapted to configure a second memory block to be compatible with the first memory block format. The processor may also configure the second memory block with actual data values corresponding to and compatible with the generic data template of the first memory block.

The processor may be adapted to link the second memory block to the first memory block. The first and second memory blocks may be a random access memory. The controller may be adapted to acquire at least a portion of the actual data values in the linked second memory block and use the acquired portion of the actual data values to control an operation of the encryption/decryption device. The processor may be adapted to map particular bits of the generic data template to at least one operation for controlling the encryption/decryption device. Particular values of the mapped bits may be translated into one or more operations which may be used to control the encryption/decryption device.

At least a portion of the actual data values may be adapted to represent, for example, a memory read operation in a particular format, a memory write operation in the particular format, an encryption operation in a particular mode, a decryption operation in the particular mode, and a particular key to utilize for the encryption and decryption operations. The particular format for the read and write operations may be a big-endian or little-endian format. The particular mode for the encryption and decryption operations may be a DES mode or 3DES mode.

These and other advantages, aspects and novel features of the present invention, as well as details of a illustrated embodiment thereof, will be more fully understood from the following description and drawings.

DETAILED DESCRIPTION OF THE INVENTION

Certain embodiments of the invention provide a method and system for controlling an encryption/decryption device or engine using descriptors. A method for controlling an encryption/decryption device using descriptors may include formatting a first block of memory to contain a generic data template used to control the encryption/decryption device. The first memory bock may be configured with actual data values corresponding to the generic data template. At least a portion of the configured actual data values may be acquired and used for controlling one or more operations of the encryption/decryption device. A second memory block may be configured in a manner compatible with the first memory block format. The second memory block may also be configured with actual data values corresponding to the generic data template of first block of memory. The second block of memory may be linked to the first memory block. The first and second block of memory may be a random access memory.

Data encryption and decryption may include the transfer of a block of data from a first memory location to a second memory location in a random access memory such as a DRAM. During the transfer of the block of data from the first memory location, if an encryption mode is selected, the data may be buffered, encrypted, and then stored in the second memory location. In another aspect of the invention, if during the transfer of the block of data from the first memory location, a decryption mode is selected, the data may be buffered, decrypted and then stored in the second memory location. In another aspect of the invention, if during the transfer of the block of data from the first memory location, a bypass mode is selected, the data may be buffered and then stored in the second memory location. In this regard, the encryption and decryption operations may be bypassed.

Figure 1:
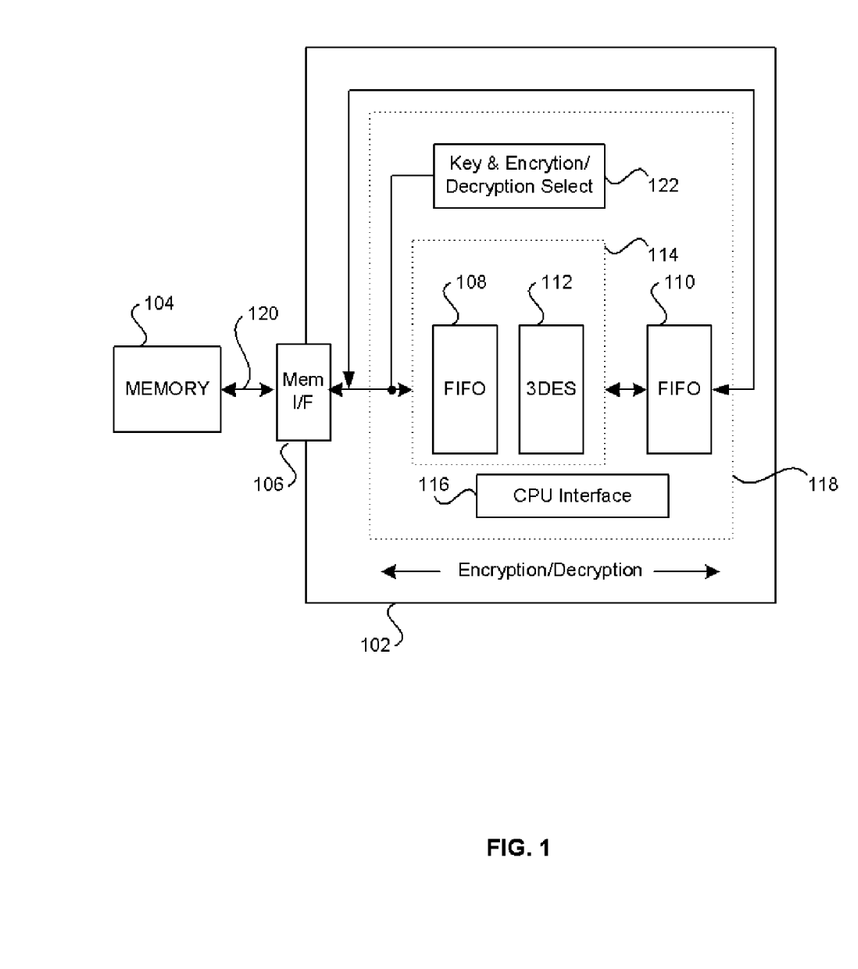
FIG. 1 is a block diagram of an exemplary system for memory to memory encryption/decryption in accordance with an embodiment of the invention.

FIG. 1 is a block diagram of an exemplary system for memory to memory (MEM-MEM) encryption/decryption in accordance with an embodiment of the invention. Referring to FIG. 1, there is shown a chip 102 having integrated therein, an memory DMA block (MEM-DMA) block 118 and a memory interface block 106. The memory DMA block 118 may include FIFO block 110, 3DES block 112, CPU interface 116 and key and encryption/decryption select and control block 122. The encryption/decryption block processor 114 may include FIFO block 108 and 3DES block 112.

The memory interface block 106 may be integrated within chip 102 and may be adapted to provide connectivity between the memory DMA block 118 and memory block 104. The memory interface block 106 may be, for example, a memory controller. Accordingly, suitable logic and/or a bus 120 may provide connectivity between the memory interface block 106 and the memory 104. The memory 104 may be a random access memory (RAM) such as a dynamic RAM (DRAM). In a case where memory 104 is a DRAM, then memory interface block 106 may be a DRAM controller. However, the invention is not limited in this regard, and other types of memories and corresponding memory controllers may be utilized.

The key and encryption/decryption select and control block 122 may include suitable control logic and/or circuitry that may be adapted to select a function to be performed by the encryption/decryption processor block 114. In this regard, the encryption/decryption processor block 114 may be adapted to select or deselect one of an encryption operation, a decryption operation and a bypass function. The control logic and/or circuitry in the key and encryption/decryption select and control block 122 may further be adapted to facilitate selection and control of encryption and decryption keys to be utilized by the 3DES block 112. In this regard, the encryption/decryption select and control block 122 may control which of a plurality of keys may be utilized by the 3DES block 112. The key and encryption/decryption select and control block 122 may further include suitable control logic and/or circuitry that may be adapted to provide various select signals that may be used to route data throughout chip 102 when any of the encryption, decryption, or bypass functions or operations may be required.

The CPU interface block 116 may include suitable logic and/or circuitry that may be adapted to provide control of the operation of chip 102 by an external processor. The external processor may be a host processor.

In operation, data to be encrypted by the encryption/decryption processor block 114 may be transferred to the FIFO block 108 in the encryption/decryption processor block 114, where it may be buffered. The data may be transferred from a first memory location in memory block 104. Notwithstanding, the memory interface block 106 may be adapted to control the transfer of the unencrypted data from the memory block 104 to the FIFO block 108 for decryption.

The key and encryption/decryption select and control block 122 may select an encryption operation to be performed by the encryption/decryption processor control block 114. The key and encryption/decryption select and control block 122 may also be adapted to select and supply appropriate encryption keys to be utilized by the encryption/decryption processor control block 114 during the encryption operation. The 3DES block may utilize the supplied encryption keys to encrypt the data. The encrypted data may be buffered in FIFO 110. The memory interface block 106 may be adapted to control the transfer of the encrypted buffered data from FIFO 110 to the memory block 104. In this regard, the encrypted data may be stored in a second memory location that differs from the location in memory block 104 where the unencrypted data was originally stored.

In operation, encrypted data requiring decryption by the encryption/decryption processor block 114 may be transferred to the FIFO block 108 in the encryption/decryption processor block 114, where it may be buffered. The data may be transferred from a first memory location in memory block 104. Notwithstanding, the memory interface block 106 may be adapted to control the transfer of the encrypted data from the memory block 104 to the FIFO block 108 for decryption.

The key and encryption/decryption select and control block 122 may be adapted to select a decryption operation to be performed by the encryption/decryption processor control block 114. The key and encryption/decryption select and control block 122 may also be adapted to select and supply appropriate decryption keys to be utilized by the encryption/decryption processor control block 114 during the encryption operation. The 3DES block 112 may utilize the supplied decryption keys to encrypt the data. The decrypted data may be buffered in FIFO 110. The memory interface block 106 may be adapted to control the transfer of the decrypted buffered data from FIFO 110 to the memory block 104. In this regard, the decrypted data may be stored in a second memory location, which may differ from the location in memory block 104 where the encrypted data was originally stored.

Figure 2:
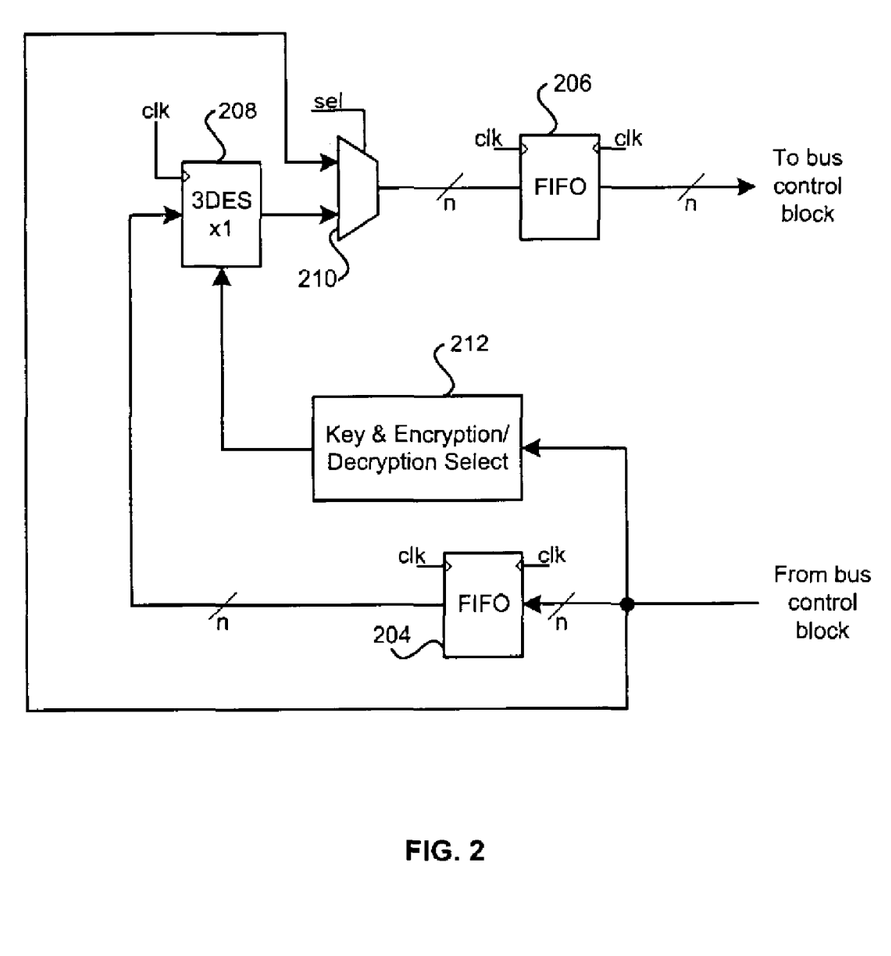
FIG. 2 is a block diagram illustrating the encryption/decryption of data using exemplary memory to memory system of FIG. 1 in accordance with an embodiment of the invention.

FIG. 2 is a block diagram illustrating the encryption/decryption of data using the exemplary memory to memory system of FIG. 1 in accordance with an embodiment of the invention. Referring to FIG. 2, there are shown FIFO buffers 204, 206, selector 210, key and encryption/decryption select and control block 212, and 3DES block 208.

The selector 210 may be a multiplexer having a select line adapted to select between a first input and a second input of the selector 210. By selecting between a first input and a second input of selector 210, and encryption/decryption or bypass mode of operation may be selected. In the encryption/decryption mode of operation, an output of the 3DES block 208 may be coupled to a second input of the selector 210, thereby buffering an encrypted or decrypted output of the 3DES block 208 in FIFO 206. In the bypass mode of operation, incoming data from a bus control block, for example, the memory interface block 106 of FIG. 1, may be communicated through a first input of selector 210 into FIFO buffer 206. The bus control block may then control the writing of data from the FIFO buffer into, for example, a memory such as memory block 104 of FIG. 1.

FIFOs 204, 206 may be adapted to buffer incoming data and outgoing data respectively. In this regard, FIFOs 204, 206 may include a first input clock and a second input clock signals. The buffers 204, 206 may be adapted to handle n-bits wide data, where n may be equivalent to 128, for example. The 3DES block may also include an input clock signal. The selector 210, FIFO buffers 204, 206 and 3DES block 208 may be adapted to handle n-bit wide data. In one aspect of the invention, n may be 128 or other suitable value.

In operation, data received from a bus control block for encryption may be buffered in FIFO buffer 204. During the encryption operation, suitable logic may be adapted to deselect or disable a first input of selector 210 and select or enable a second input of selector 210. In this regard, the key and encryption/decryption select and control block 212 may include suitable logic and/or circuitry that may be adapted to control the select pin of selector 210. In this regard, the key and encryption/decryption select and control block 212 may be adapted to select appropriate inputs of the selector 210, depending on the mode of operation. The key and encryption/decryption select and control block 212 may also be adapted to select and supply keys to be utilized by the 3DES block 208 during the encryption operation. Using the appropriate encryption keys, the 3DES block 208 may encrypt the data. The encrypted data may subsequently be communicated through selector 210 via its second input and buffered in FIFO 206.

In operation, data received from a bus control block for decryption may be buffered in FIFO buffer 204. During the decryption operation, the key and encryption/decryption control block 212 may be adapted to deselect or disable a first input of selector 210 and select or enable a second input of selector 210. In this regard, the key and encryption/decryption select and control block 212 may control the select pin of selector 210 to disable the first input of selector 210 and enable the second input of selector 210. The key and encryption/decryption select and control block 212 may also be adapted to select and supply appropriate decryption keys to be utilized by the 3DES block 208 during the decryption operation. Using the appropriate decryption keys, the 3DES block 208 may decrypt the data. The decrypted data may subsequently be communicated through selector 210 via its second input and buffered in FIFO 206.

In operation, during the bypass mode of operation, the 3DES block 208 may be bypassed, and the data is neither encrypted or decrypted, but remains in its same state. In this regard, the key and encryption/decryption select and control block 212 may control the select pin of selector 210 to enable the first input of selector 210 and disable the second input of selector 210. As a result, the data from the bus control register may bypass FIFO 204 and 3DES block 208, pass through the first input of selector 210 and be buffered in FIFO 206.

Figure 3:
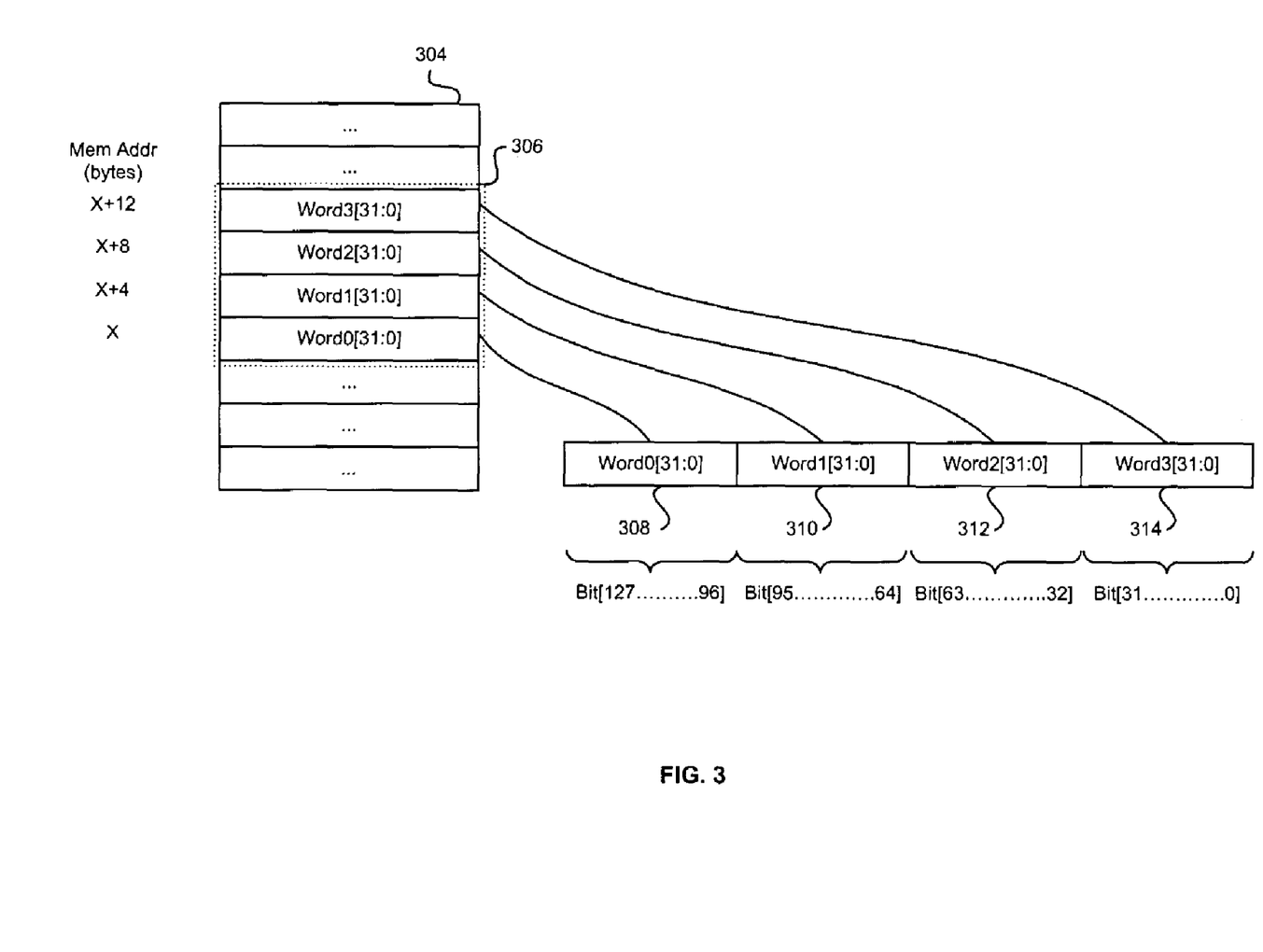
FIG. 3 is a block diagram of an exemplary memory system that may include a descriptor block, which may be utilized to control an encryption/decryption engine in accordance with an embodiment of the invention.

FIG. 3 is a block diagram of an exemplary memory system that may include a descriptor block, which may be utilized to control an encryption/decryption device or engine in accordance with an embodiment of the invention. Referring to FIG. 3 there is shown a contiguous block of memory 304 having a descriptor 306. The descriptor 306 may include four (4) 32-bit words, thereby making the descriptor 128-bits in size.

The first 32-bit word of descriptor 306, namely word0 308, may represent bits 127 through 96. The second 32-bit word of descriptor 306, namely word1 310, may represent bits 95 through 64. The third 32-bit word of descriptor 306, namely word2 312, may represent bits 63 through 32. Finally, the fourth 32-bit word of descriptor 306, namely word3 314, may represent bits 31 through 0. Word0 308, may start at the base address X. Word1 may reside at an offset of four (4) bytes from base address X. Word2 may reside at an offset of eight (8) bytes from base address X. Finally, word3 may reside at an offset of twelve (12) bytes from base address X.

Notwithstanding, it should be recognized that a descriptor may vary in size depending on the application. Although descriptor 306 may contain 128 bits, a descriptor may contain 2, 4, 8, 16, 32, 64, 96, 256 bits, for example. Furthermore, in certain applications, it may be necessary to arrange descriptors in a daisy chain fashion. In this regard, daisy chaining two or more descriptors may extend the size of a descriptor.

Figure 4:
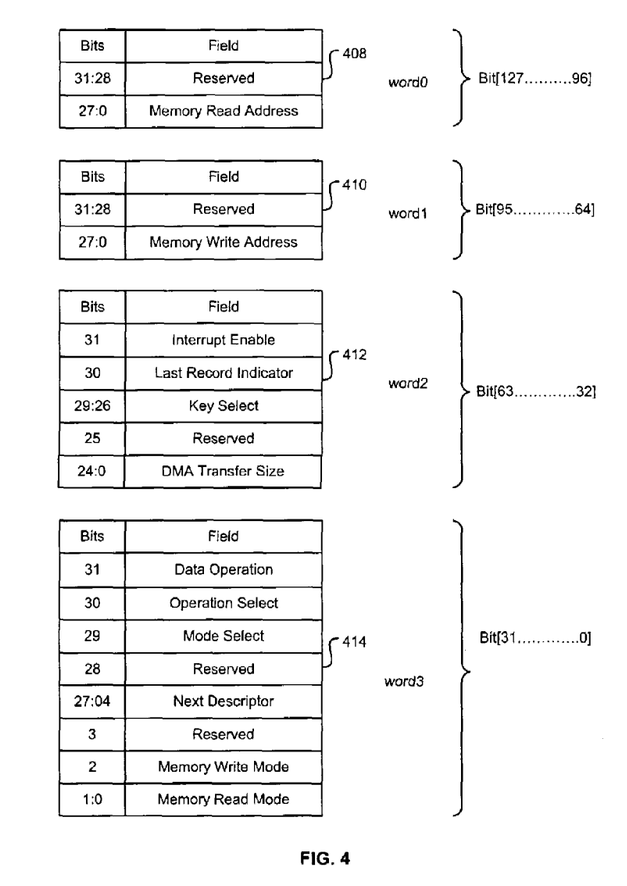
FIG. 4 is a block diagram of an exemplary descriptor that may be utilized for controlling an encryption/decryption engine in accordance with an embodiment of the invention.

FIG. 4 is a block diagram of an exemplary descriptor that may be utilized for controlling an encryption/decryption engine in accordance with an embodiment of the invention. Referring to FIG. 4, word0 408 may include a 4-bit reserved field and a 28-bit memory read address. Word1 410 may include a 4-bit reserved field and a 28-bit memory write address. Word2 412 may include a 1-bit interrupt enable field and a 1-bit last record indicator field. Word2 412 may also include a 4-bit key select field, a 1-bit reserved field and a 24-bit DMA transfer size field. Word3 414 may include a 1-bit data operation field, a 1-bit operation select field, a 1-bit mode select field, a 1-bit reserved field, and a 24-bit next descriptor field. Word3 414 may also include a 1-bit reserved field, a 1-bit memory write mode field and finally, a 2-bit memory read mode field.

Referring to word0 408, the memory read address field may represent a local memory read address for the current descriptor's DMA record. The 4-bit reserved field may be loaded with a default value. For word1 410, the memory write address field may represent a local memory write address for the current descriptor's DMA record. The 4-bit reserved field of word1 may also be loaded with a default value.

Referring to word2, the 1-bit interrupt enable field may be used to enable or disable the generation of an interrupt by the descriptor. For example, a value of zero (0) may be used to disable generation of an interrupt. A value of one (1) may result in the generation of an interrupt at the end of the current descriptor record. The 4-bit key select field may be used to select one or more keys to be utilized during an encryption/decryption operation. For example, in a case where there may be two (2) encryption/decryption keys, namely key0, key1, a value of zero (0) may represent key0 and a values of one (1) may represent key1. In this regard, a values of zero (0) may be used to select memory DMA key0, which may be associated with a physical key address of, for example four (4), for the encryption/encryption data operation. Similarly, a value of one (1) may be used to select memory DMA key1, which may be associated with a physical key address of, for example five (5), for the encryption/encryption data operation. In a case where there are only be two keys, then key0 and key1 may be the only valid key selections. Accordingly, other selections may cause the memory DMA descriptor to generate and error interrupt, which may cause the DMA engine to return to an idle state without any data transfer.

The 1-bit reserved field in word2 412 may be assigned a default value of zero (0) for example. The 25-bit DMA transfer size field of word2 412 may be adapted to define the DMA transfer size in bytes, The DMA transfer size may have a maximum and a minimum value dependent on system specification. For example, the DMA transfer size field may have a maximum size of 16 megabytes and a minimum size of zero (0) bytes. The DMA transfer size may be represented in bytes. In certain instances, if the DMA transfer size is zero (0) bytes, then there are no bus activity for the DMA record and a current record being transferred may be treated as being complete.

Referring to word3, the 1-bit data operation field may be adapted to enable or disable data transfer for an encryption or decryption operation. For example, a value of zero (0) may disable data transfer and a value of one (1) may enable data transfer. Dependent on various hardware limitations for example, whenever an encryption or decryption operation may be enabled, the transfer size may be limited to multiples of 8 bytes. Notwithstanding, the invention is not limited in this regard.

The 1-bit operation select field may be used to select an encryption or decryption operation. For example, a value of zero (0) may select an encryption operation and a value of one (1) may select a decryption operation. The 1-bit mode select field may be used to select an encryption or decryption mode of operation. For example, a value of zero (0) may select an DES encryption/decryption mode of operation and a value of one (1) may select a 3DES encryption/decryption mode of operation.

The 1-bit reserved field of word3 may have a default value of, for example, zero (0). The next descriptor field may contain an address of the next descriptor. Dependent on the memory arrangement utilized, the next descriptor field may be restricted to containing an address that may be aligned on a 16-byte address boundary. In this case, the address bits[3:0] of word3 may not be required and may be otherwise utilized. In this regard, bit[3] of word3 may be reserved and assigned, for example, a default value of zero (0). The 1-bit memory write mode may specify a byte format that may be utilized when reading data stored in memory. For example, a value of zero (0) may represent a memory read of data which may be in big-endian format. A value of one (1) may represent a memory read of data which may be in little-endian format. The 2-bit memory write mode may specify an endian translation method that may be utilized for data writes to memory during the DMA record transfer. In this regard, a value of 0x0 may signify that data may already be word aligned and consequently, no translation may be required. A value of 0x1 may signify that data may be half word aligned. Accordingly, bytes zero (0) and one (1) may be swapped with bytes two (2) and three (3). Finally, a value of 0x2 may signify that data may be byte aligned. Accordingly, all the bytes in a 32-bit word may be swapped. A value of 0x3 may be reserved.

In accordance with an embodiment of the invention, one or more descriptors may be configured to control an encryption/decryption operation. In this regard, a list of descriptors which may reside in a local memory, may be created. The address of the first descriptor may be aligned on a 16-byte memory address boundary. However, the invention is not limited in this regard. DRAM read and write addresses may be the offset only addresses, and may not have to include the base address. For example, Descriptor0 may be as follows:
Descriptor0 Address in DRAM=32'h0060_0000
SDRAM Read Address, word 0[31:0]=32'h00F0_0000
SDRAM write Address, word1[31:0]=32'h0A00_0000
Transfer Size=2K bytes, word2[31:0]=32'h0000_0800
Next descriptor address, word3[31:0]=32'h0060_0010
Descriptor1 may be as follows:
Descriptor1 Address in DRAM=32'h0060_0010
SDRAM Read Address, word0[31:0]=32'h0F1_0000
SDRAM Write Address, word1[31:0]=32'h0A01_0000
Transfer Size=3 K bytes, word2[31:0]=32'h00_0C00
Next descriptor address, word3[31:0]=32'hxxxx_xxx0
The contents of the DRAM address may be as follows:

| Address | Content |
| --- | --- |
| 28'h0060_0000 | 32'h00F0_0000 |
| 28'h060_0004 | 32'0A00_0000 |
| 28'h060_0008 | 32'h0000_0800 |
| 28'h060_000C | 32'h0060_0010 |
| 28'h060_0010 | 32'h00F1_0000 |
| 28'h060_0014 | 32'h0A01_0000 |
| 28'h060_0018 | 32'hC000_0C00 |
| 28'h060_001C | 32'hxxxx_xxx0 |

Referring to descriptor0, the data operation field, namely bit[31] may be set to disable the transfer of data with the encryption operation selection by bit[30]. Moreover, the mode select field, namely bit[29] of descriptor0 may be set to perform a DES encryption operation. Bit[2] specifies that the memory read operation may be configured to operate in big endian format. The memory write data may be word-aligned format as signified by bits[1:0] of descriptors. Finally, since this may not be the last descriptor, then no interrupt is set to be generated by descriptors. In this regard, the value of bit[31] of word[2] of descriptors is set to a value of zero (0).

Descriptor1 is chained to descriptors. In this regard, the next descriptor address field, namely word3[31:0] of descriptors contains an address of 32'h0060_0010, which is the address of descriptors A daisy chain of descriptors may be similarly created by linking a third descriptor to descriptor1 and so on. However, in this example, descriptor1 is the last descriptor. Accordingly, an interrupt may be set to be generated by this descriptor. In this regard, the value of bit[31] of word[2] of descriptor1 may be set to a value of one (1). Bit[2] of descriptor1 specifies that the memory read operation may be configured to operate in big endian format. The memory write data may be word-aligned format as signified by bits[1: 0] of descriptor1.

Figure 5:
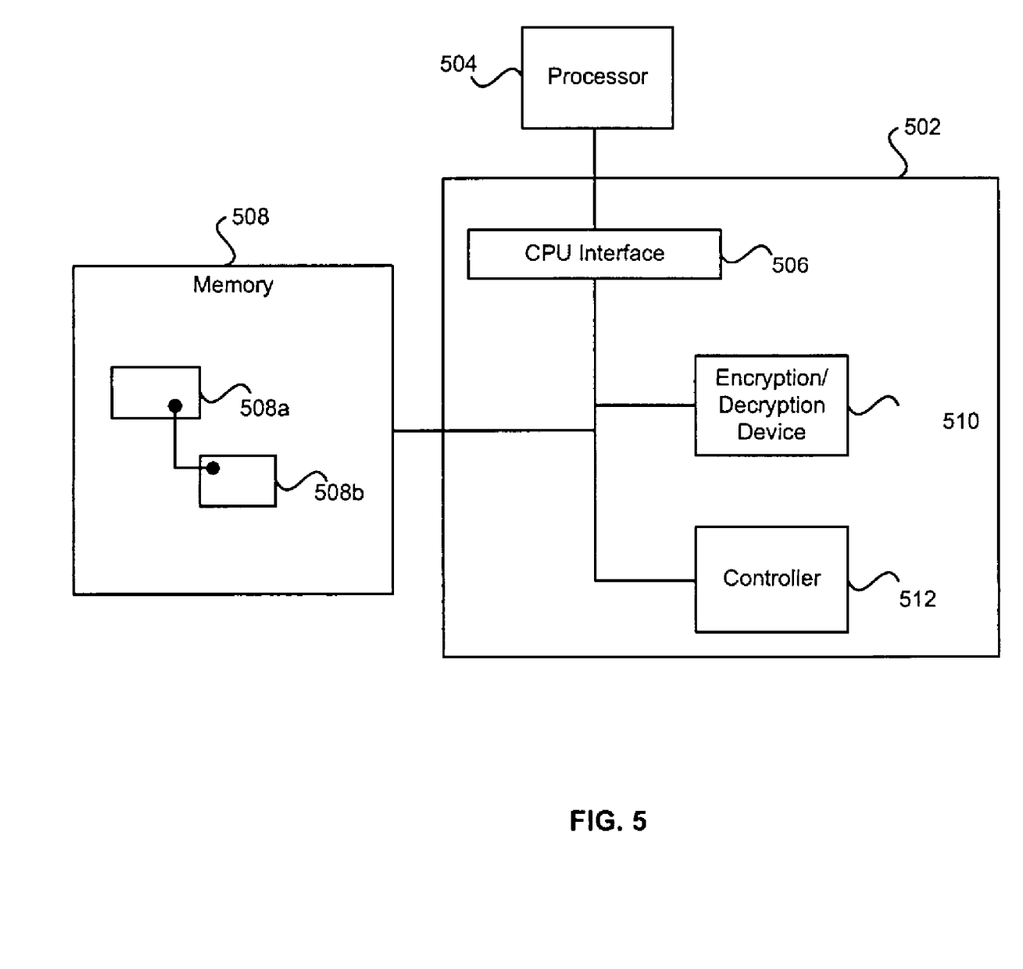
FIG. 5 is a block diagram of an exemplary system for controlling an encryption/decryption device using descriptors in accordance with an embodiment of the invention.

FIG. 5 is a block diagram of an exemplary system for controlling an encryption/decryption device using descriptors in accordance with an embodiment of the invention. Referring to FIG. 5, there is shown a processor 504, CPU interface 506, memory 508, controller 512 and encryption/decryption device 510. CPU interface 506, controller 512 and encryption/decryption device 510 may be integrated within a chip. CPU interface 506 provides connectivity between processor 504 and chip 502.

In accordance with an embodiment of the invention, processor 504 may be adapted to format a first block of memory 508a to contain a generic data template for controlling the encryption/decryption device 510. The processor 504 may be adapted to configure the first memory block 508a with actual data values corresponding to the generic data template. The formatted first memory block 508a may be a descriptor. Controller 512 may be adapted to acquire at least a portion of the configured actual data values and use these data values to control one or more operations of the encryption/decryption device 510. The processor 504 may be adapted to configure a second memory block 508b to be compatible with the format of the first memory block 508a. The second memory block 508b may be a second descriptor. The processor 504 may also be adapted to configure the second memory block 508b with actual data values corresponding to and compatible with the generic data template of the first memory block 508a.

The processor 504 may be adapted to link the second memory block 508b to the first memory block 508a. The first and second memory blocks 508a, 508b respectively, may be located within random access memory 508. The controller 512 may be adapted to acquire at least a portion of the actual data values in the linked second memory block 508b and use the acquired portion of the actual data values to control an operation of the encryption/decryption device 512. The processor 504 may also be adapted to map particular bits of the generic data template to at least one operation for controlling the encryption/decryption device 510. Particular values of the mapped bits may be translated into one or more operations which may be used to control the encryption/decryption device 510.

At least a portion of the actual data values may be adapted to represent, for example, a memory read operation in a particular format, a memory write operation in the particular format, an encryption operation in a particular mode, a decryption operation in the particular mode, and a particular key to utilize for the encryption and decryption operations. The particular format for the read and write operations may be a big-endian or little-endian format. The particular mode for the encryption and decryption operations may be a DES mode or 3DES mode.

In another aspect of the invention, a 3DES encryption/decryption simulation may be provided to illustrate exemplary encryption and decryption processes. During the simulation, an input data may acquired from an input file. For example, an input file, namely test1.encrypt.dat, may contain the following information:

0 0 01234567 89abcdef fedcba98 76543210
23456789 abcdef01
456789ab cdef0123

In this regard, the input file may specify a 3DES encryption using a key of, for example, 01234567 89abcdef fedcba98 76543210, on two 64-bit words of data. The two 64-bit words of data may be 23456789abcdef01 and fedcba9876543210.

Upon executing the 3DES operation using, for example, 3DES block 208 of FIG. 2, with the test1.encrypt.dat input file, an output file may be generated. In this regard, an output file, namely test1.encrypt.dat.out, may be generated. The contents of the generated test1.encrypt.dat.out file may be as follows:

a47606af 132eeff7
792e2b91 7c75dce4

The encrypted data in the test1.encrypt.dat.out file may be decrypted using the following test1.decrypt.dat.in file. The contents of the test1.decrypt.dat.in file may be as follows.

1 0 01234567 89abcdef fedcba98 76543210
a47606af 132eeff7
792e2b91 7c75dce4

Upon decryption of the test1.decrypt.dat.in file, an output file, namely test1.decrypt.dat may be generated. The contents of test1.decrypt.dat file may be as follows.

23456789 abcdef01
456789ab cdef0123

In this case, the decryption returns the original data.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for controlling at least one encryption/decryption device, the method comprising:
   formatting a first block of memory to contain a generic data template for controlling the at least one encryption/decryption device;
   configuring said first block of memory with actual data values corresponding to said generic data template, wherein each of said actual data values comprises a plurality of bits;
   acquiring at least a portion of said configured actual data values; and
   controlling at least one operation of the at least one encryption/decryption device using said acquired at least a portion of said actual data values.

2. The method according to claim 1, comprising configuring a second block of memory to be compatible with said format of said first block of memory.

3. The method according to claim 2, comprising configuring said second block of memory with actual data values corresponding to said generic data template of said first block of memory, said format of said second block of memory compatible with said format of said first block of memory.

4. The method according to claim 3, comprising linking said second block of memory to said first block of memory.

5. The method according to claim 2, wherein said second block of memory and said first block of memory are random access memory (RAM).

6. The method according to claim 4, comprising acquiring at least a portion of said actual data values in said linked second block of memory.

7. The method according to claim 6, wherein said controlling comprises controlling said at least one operation using said acquired at least a portion of said actual data values in said linked second block of memory.

8. The method according to claim 1, comprising mapping particular bits of said generic data template to said at least one operation for said controlling of said at least one encryption/decryption device.

9. The method according to claim 8, comprising translating particular values of said mapped bits into said at least one operation for said controlling of said at least one encryption/decryption device.

10. The method according to claim 9, wherein said at least a portion of said actual data values represents one of: a memory read operation in a particular format, a memory write operation in said particular format, an encryption operation in a particular mode, a decryption operation in said particular mode, and a particular key to utilize for said encryption and said decryption operation.

11. The method according to claim 10, wherein said particular format for said read operation and said write operation is one of: a big-endian format and a little-endian format.

12. The method according to claim 11, wherein said particular mode for said encryption operation and said decryption operation is one of: a DES mode and a 3DES mode.

13. A machine-readable storage having stored thereon, a computer program having at least one code section for controlling operation of at least one encryption/decryption device, the at least one code section executable by a machine for causing the machine to perform steps comprising:
   formatting a first block of memory to contain a generic data template for controlling the at least one encryption/decryption device;
   configuring said first block of memory with actual data values corresponding to said generic data template, wherein each of said actual data values comprises a plurality of bits;
   acquiring at least a portion of said configured actual data values; and
   controlling at least one operation of the at least one encryption/decryption device using said acquired at least a portion of said actual data values.

14. The machine-readable storage according to claim 13, comprising code for configuring a second block of memory to be compatible with said format of said first block of memory.

15. The machine-readable storage according to claim 14, comprising code for configuring said second block of memory with actual data values corresponding to said generic data template of said first block of memory, said format of said second block of memory compatible with said format of said first block of memory.

16. The machine-readable storage according to claim 15, comprising code for linking said second block of memory to said first block of memory.

17. The machine-readable storage according to claim 14, wherein said second block of memory and said first block of memory are random access memory (RAM).

18. The machine-readable storage according to claim 16, comprising code for acquiring at least a portion of said actual data values in said linked second block of memory.

19. The machine-readable storage according to claim 18, comprising code for controlling said at least one operation using said acquired at least a portion of said actual data values in said linked second block of memory.

20. The machine-readable storage according to claim 13, comprising code for mapping particular bits of said generic data template to said at least one operation for said controlling of said at least one encryption/decryption device.

21. The machine-readable storage according to claim 20, comprising code for translating particular values of said mapped bits into said at least one operation for said controlling of said at least one encryption/decryption device.

22. The machine-readable storage according to claim 21, wherein said at least a portion of said actual data values represents one of: a memory read operation in a particular format, a memory write operation in said particular format, an encryption operation in a particular mode, a decryption operation in said particular mode, and a particular key to utilize for said encryption and said decryption operation.

23. The machine-readable storage according to claim 22, wherein said particular format for said read operation and said write operation is one of: a big-endian format and a little-endian format.

24. The machine-readable storage according to claim 23, wherein said particular mode for said encryption operation and said decryption operation is one of: a DES mode and a 3DES mode.

25. A system for controlling at least one encryption/decryption device, the system comprising:
   at least one processor adapted to format a first block of memory to contain a generic data template for controlling the at least one encryption/decryption device;
   said at least one processor adapted to configure said first block of memory with actual data values corresponding to said generic data template, wherein each of said actual data values comprises a plurality of bits;

at least one controller adapted to acquire at least a portion of said configured actual data values; and said at least one controller adapted to control at least one operation of the at least one encryption/decryption device using said acquired at least a portion of said actual data values.

26. The system according to claim 25, wherein said at least one processor configures a second block of memory to be compatible with said format of said first block of memory.

27. The system according to claim 26, wherein said at least one processor configures said second block of memory with actual data values corresponding to said generic data template of said first block of memory, said format of said second block of memory compatible with said format of said first block of memory.

28. The system according to claim 27, wherein said at least one processor is adapted to link said second block of memory to said first block of memory.

29. The system according to claim 26, wherein said second block of memory and said first block of memory are random access memory (RAM).

30. The system according to claim 28, wherein said at least one controller is adapted to acquire at least a portion of said actual data values in said linked second block of memory.

31. The system according to claim 30, wherein said at least one controller is adapted to control said at least one operation using said acquired at least a portion of said actual data values in said linked second block of memory.

32. The system according to claim 25, wherein said at least one processor is adapted to map particular bits of said generic data template to said at least one operation for said controlling of said at least one encryption/decryption device.

33. The system according to claim 32, comprising translating particular values of said mapped bits into said at least one operation for said controlling of said at least one encryption/decryption device.

34. The system according to claim 33, wherein said at least a portion of said actual data values represent one of: a memory read operation in a particular format, a memory write operation in said particular format, an encryption operation in a particular mode, a decryption operation in said particular mode, and a particular key to utilize for said encryption and said decryption operation.

35. The system according to claim 34, wherein said particular format for said read operation and said write operation is one of: a big-endian format and a little-endian format.

36. The system according to claim 35, wherein said particular mode for said encryption operation and said decryption operation is one of: a DES mode and a 3DES mode.

* * * * *